(12) United States Patent
Thomas

(10) Patent No.: US 9,889,727 B2
(45) Date of Patent: Feb. 13, 2018

(54) ATTACHABLE CANOPY FOR RIDING LAWNMOWER

(71) Applicant: Craig Thomas, Oak Park, MI (US)

(72) Inventor: Craig Thomas, Oak Park, MI (US)

(*) Notice: Subject to any disclaimer, the term of this patent is extended or adjusted under 35 U.S.C. 154(b) by 66 days.

(21) Appl. No.: 15/168,769

(22) Filed: May 31, 2016

(65) Prior Publication Data
US 2017/0341495 A1    Nov. 30, 2017

(51) Int. Cl.
*B60J 7/10* (2006.01)

(52) U.S. Cl.
CPC ..................... *B60J 7/102* (2013.01)

(58) Field of Classification Search
CPC .......................................... B60J 7/102
USPC ....................................................... 296/102
See application file for complete search history.

(56) References Cited

U.S. PATENT DOCUMENTS

| | | | | |
|---|---|---|---|---|
| 8,222 A * | 7/1851 | Hibbard | ............... | B62B 9/14 135/133 |
| 462,265 A * | 11/1891 | Mason | ............... | A01K 97/10 135/88.02 |
| 840,406 A * | 1/1907 | Williams | ............... | A45B 11/00 248/231.41 |
| 1,716,212 A * | 6/1929 | Cushman | ............... | B62D 33/0617 296/102 |
| 2,593,909 A * | 4/1952 | Moreland | ............... | B60J 9/04 135/117 |
| 2,665,165 A * | 1/1954 | Pitman | ............... | B60N 2/24 296/102 |
| 2,689,579 A * | 9/1954 | Sartori | ............... | B63B 17/02 135/133 |
| 3,455,598 A | 7/1969 | Harold et al. | | |
| 5,022,420 A | 6/1991 | Brim | | |
| 5,232,005 A | 8/1993 | Mitchell | | |
| 5,842,732 A * | 12/1998 | Daggett | ............... | B60J 7/165 135/88.01 |
| 5,882,063 A | 3/1999 | Job | | |
| D408,038 S | 4/1999 | Lollis | | |
| 6,059,351 A | 5/2000 | Ehnes | | |
| 6,557,922 B1 * | 5/2003 | Hommel | ............... | B60J 7/165 280/DIG. 5 |
| 6,663,161 B1 * | 12/2003 | Tyrer | ............... | B60J 7/10 296/100.11 |
| D515,106 S * | 2/2006 | Taber | ............... | D15/28 |
| 7,152,903 B2 | 12/2006 | Westendorf et al. | | |
| 7,175,224 B2 * | 2/2007 | Held | ............... | B62D 33/06 135/88.07 |
| 7,182,399 B2 | 2/2007 | Kamerer | | |

(Continued)

*Primary Examiner* — Pinel E Romain
(74) *Attorney, Agent, or Firm* — The Keys Law Firm PLLC

(57) ABSTRACT

An attachable canopy for a riding lawnmower for providing a shading mechanism for a user seated on such a lawnmower includes a harness formed from a wrap around elongated strap that has a first end that is connectable to a second end, a frame which includes two elongated rods whose proximal ends are connected to opposite sides of the harness, and a canopy which is connected to the distal ends of the rods. The harness is adjustable so as to be attachable to either the seat or seat back of a riding lawnmower. In this regard, the rods which form the frame may selectively swivel at least ninety degrees so as to remain in a perpendicular orientation relative to the seat with the canopy held over the seat regardless of which structure the harness is attached to.

13 Claims, 2 Drawing Sheets

(56) References Cited

U.S. PATENT DOCUMENTS

| | | | | |
|---|---|---|---|---|
| 7,258,381 B2 * | 8/2007 | Sturt | ................... | B60R 7/04 |
| | | | | 296/24.34 |
| 7,464,963 B2 * | 12/2008 | Hepner | ................... | B60N 2/24 |
| | | | | 280/756 |
| 7,513,553 B2 * | 4/2009 | Singh | ................... | B60N 3/08 |
| | | | | 296/37.8 |
| 7,677,634 B2 * | 3/2010 | Flynn | ................... | B60J 7/1226 |
| | | | | 296/107.09 |
| 8,371,633 B2 * | 2/2013 | Beyer | ................... | B60N 3/08 |
| | | | | 224/280 |
| 2003/0183262 A1 * | 10/2003 | Tyrer | ................... | B60J 7/1295 |
| | | | | 135/88.09 |

* cited by examiner

… (1)

ATTACHABLE CANOPY FOR RIDING LAWNMOWER

BACKGROUND OF THE INVENTION

Field of the Invention

This invention relates generally to land vehicle accessories and, more particularly, to an extendible canopy with a frame that is removably attachable to the seat of a riding lawnmower.

Description of the Prior Art

The use and design of conventional riding lawn mowers is generally well known. Such riding mowers are generally less strenuous to a user is attempting to mow a large area because the user is able to remain seated on the mower as it moves. A problem which still exists, however, is that despite being less strenuous, many of such riding mowers generally offer little protection to a seated user from direct exposure to sunlight.

Thus, there remains a need for an attachable canopy for a riding lawnmower which could provide shade to a user seated on a riding lawnmower. It would be helpful if such an attachable canopy for a riding lawnmower included an integral harness which allowed it to removable attach to either a seatback or seat bottom of a conventional riding lawnmower. It would be additionally desirable for such an attachable canopy for a riding lawnmower to include an elongated metal frame to allow the integral canopy to be suspended above a user seated on the riding lawnmower.

The Applicant's invention described herein provides for an attachable canopy adapted to allow a user selectively deploy a shading apparatus from their riding lawnmower. The primary components in Applicant's attachable canopy for a riding lawnmower are a harness, frame, and canopy. When in operation, the attachable canopy for a riding lawnmower provides shade to a user seated in a riding lawnmower, thereby providing a more safe environment for the user. As a result, many of the limitations imposed by prior art structures are removed.

SUMMARY OF THE INVENTION

An attachable canopy for a riding lawnmower for providing a shading mechanism for a user seated on such a lawnmower. The attachable canopy for a riding lawnmower comprises a harness defining a wrap around elongated strap having a first end that is connectable to a second end, a frame defining two elongated rods whose proximal ends are connected to opposite sides of the harness, and a canopy which is connected to the distal ends of the rods. The harness is adjustable so as to be attachable to either the seat or seat back of a riding lawnmower. In this regard, the rods which define the frame are adapted to swivel at least ninety degrees so as to remain in a perpendicular orientation relative to the seat with the canopy held over the seat regardless of which structure the harness is attached to.

It is an object of this invention to provide an attachable canopy for a riding lawnmower which could provide shade to a user seated on a riding lawnmower.

It is another object of this invention to provide an attachable canopy for a riding lawnmower which includes an integral harness which allowed it to removable attach to either a seatback or seat bottom of a conventional riding lawnmower.

It is yet another object of this invention to provide an attachable canopy for a riding lawnmower which includes an elongated metal frame to allow the integral canopy to be suspended above a user seated on the riding lawnmower.

These and other objects will be apparent to one of skill in the art.

DETAILED DESCRIPTION OF THE INVENTION

Figure 1:
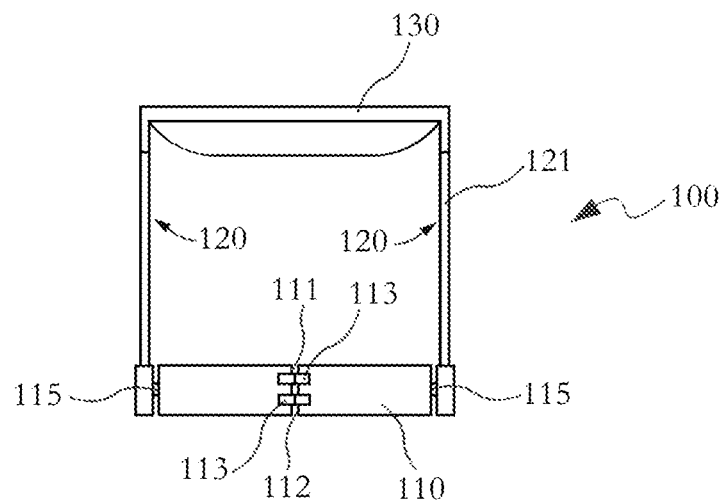
FIG. 1 is a front elevational view of an attachable canopy for a riding lawnmower built in accordance with the present invention with its harness in a seat back configuration.
Figure 2:
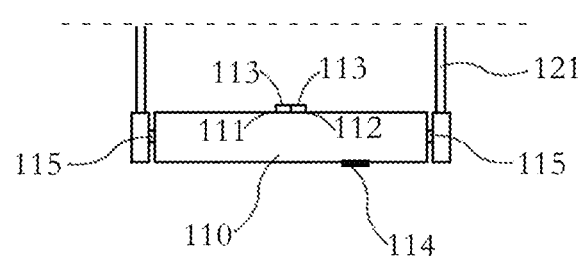
FIG. 2 is a partial front elevational view of an attachable canopy for a riding lawnmower built in accordance with the present invention with its harness in a seat configuration.
Figure 3:
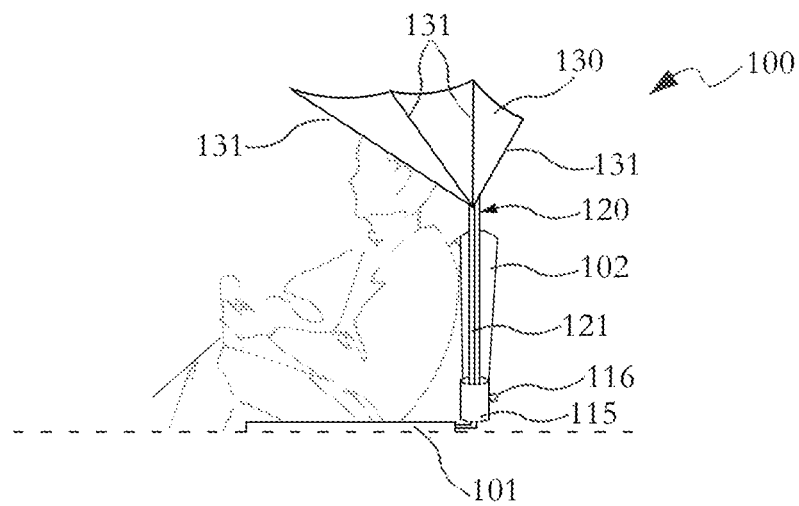
FIG. 3 is a partial side elevational view of an attachable canopy for a riding lawnmower built in accordance with the present invention in place on a riding lawnmower.
Figure 4:
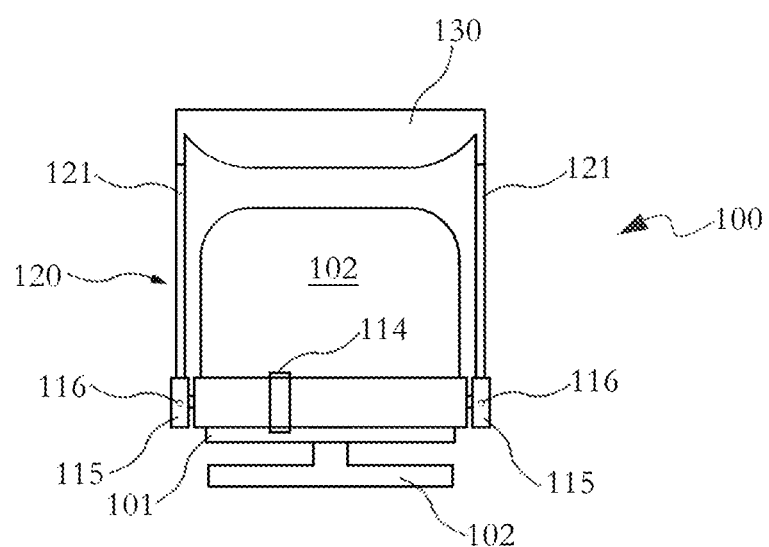
FIG. 4 is a partial rear elevational view of an attachable canopy for a riding lawnmower built in accordance with the present invention in place on a riding lawnmower.

Referring now to the drawings and in particular FIGS. 1, 2, 3, and 4, an attachable canopy for a riding lawnmower 100 is shown having a harness 110, a frame 120 defining two elongated rods 121, and a canopy 130. In one embodiment, the harness 110 is operative to attach to the seat 101 or seat back 102 of a riding lawnmower with one end of the frame 120 attached thereto, with the frame 120 extending perpendicular relative to the seat 101. At the end of the frame 120 opposite where the frame 120 attaches to the harness 110 is a canopy 130 which operates to extend over the seat 101 and provide shade to a user seated therein.

The harness 110 defines in one embodiment an elongated nylon strap with a first end 111 and a second end 112. Integral with the first end 111 and the second end 112 are two pairs of attachment members which allow the first end 111 and second end 112 to be selectively attached together. In the illustrated embodiment, the attachment members each define opposing ends of a side release buckle 113.

In one embodiment, the harness 110 includes an adjustment buckle 114 to allow for its length to be adjusted.

A pair of swivel members 115 are attached to opposing sides of the harness 110, with each of the two rods 121 of the frame 120 extending from one of the swivel members 115. The swivel members 115 allow the orientation of the rods 121 relative to the sides of the harness to be adjusted. In this regard, whether the harness 110 is in a seat back configuration to fit on a vertically aligned seat back 102 or a seat configurations to fit on a horizontally aligned seat 101, the rods 121 may be positioned upright so as to extend upward relative to the seat 101.

In one embodiment, the swivel member 115 include an integral locking mechanism keep the rods 121 in place. In such an embodiment, the locking mechanism may be released by engaging a momentary actuator button 116.

In one embodiment, each of the swivel members 115 is detachable from the harness 110.

With the proximal end of each of the rods 121 fixed to the swivel member 115, the distal end of the rods 121 are connected to opposite sides of the canopy 130. In this regard, the canopy 130 is supported from either end. In one embodiment, the canopy includes a plurality of rigid ribs 131 which extend across the canopy from one rod 121 to the other rod 121, thereby supplying rigidity to the body of the canopy 130 in the same manner as the ribs of a conventional umbrella.

The instant invention has been shown and described herein in what is considered to be the most practical and preferred embodiment. It is recognized, however, that departures may be made therefrom within the scope of the invention and that obvious modifications will occur to a person skilled in the art.

What is claimed is:

1. An attachable canopy for a riding lawnmower having a seat, comprising:
    a harness defining a loop which is adapted to be secured around at least one of the seat and a seat back of the riding lawnmower;
    a frame defining a plurality of elongated members which are movably connected to said harness; and
    a canopy integral with the frame, wherein said frame is adapted to hold said canopy above the seat of the riding lawnmower.

2. The attachable canopy of claim 1, wherein said loop is formed from an elongated strap with a first end that is connectable to a second end.

3. The attachable canopy of claim 2, wherein said first end and said second end each include corresponding portions of at least one side release buckle, thereby enabling the first end to connect to the second end.

4. The attachable canopy of claim 2, additionally comprising an adjustment buckle integral with said elongated strap so as to allow the length of the elongated strap to be selectively adjusted.

5. The attachable canopy of claim 1, additionally comprising a plurality of swivel members integral with said harness, wherein each of said plurality of elongated members are movably connected to said harness through one swivel member.

6. The attachable canopy of claim 1, wherein said canopy is integral with the frame through attaching to each of the elongated members.

7. The attachable canopy of claim 6, wherein said canopy includes a plurality of ribs.

8. The attachable canopy of claim 7, wherein at least one of said ribs extends between the plurality of elongated members attached to the canopy.

9. An attachable canopy for a riding lawnmower having a seat, comprising:
    a harness defining a an elongated strap with a first end that is connectable to a second end, wherein said harness is adapted to be secured around at least one of the seat and a seat back of the riding lawnmower;
    a plurality of swivel members integral with said harness;
    a frame defining a plurality of elongated members which are each movably connected to said harness through a connection to one swivel member; and
    a canopy integral with the frame, wherein said frame is adapted to hold said canopy above the seat of the riding lawnmower and said canopy is integral with the frame through attaching to each of the elongated members.

10. The attachable canopy of claim 9, wherein said first end and said second end each include corresponding portions of at least one side release buckle, thereby enabling the first end to connect to the second end.

11. The attachable canopy of claim 9, additionally comprising an adjustment buckle integral with said elongated strap so as to allow the length of the elongated strap to be selectively adjusted.

12. The attachable canopy of claim 9, wherein said canopy includes a plurality of ribs.

13. The attachable canopy of claim 12, wherein at least one of said ribs extends between the plurality of elongated members attached to the canopy.

* * * * *